UNITED STATES PATENT OFFICE

KARL FRIEDRICH SCHMIDT AND PHILIPP ZUTAVERN, OF LUDWIGSHAFEN-ON-THE-RHINE, GERMANY, ASSIGNORS TO KNOLL AKTIENGESELLSCHAFT, CHEMISCHE FABRIKEN, OF LUDWIGSHAFEN-ON-THE-RHINE, GERMANY, A FIRM OF GERMANY

METHOD OF MANUFACTURING IMINO-ETHERS

No Drawing. Application filed January 7, 1929, Serial No. 330,958, and in Germany February 26, 1926.

Our invention relates to the manufacture of imino-ethers. In an application previously filed by one of us which has matured into Patent No. 1,564,631, there has been described and claimed a process wherein hydrazoic acid is caused to react with carbonyl compounds so as to form acid amids according to the equation or formula:

$$R.CO.R + N_3H = N_2 + R.CO.NH.R.$$

This reaction is supposed to be due to the formation of the imine residue NH from hydrazoic acid in the presence of a suitable catalyzer, the said imine residue attaches itself to the carbonyl compound to form a hypothetical intermediate product of the formula:

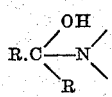

which is unsaturated, according to the valence theory and which changes into the final product by the Beckmann-Curtius molecular arrangement theory as shown by the following:—

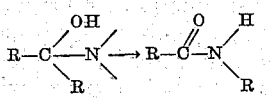

Such an arrangement always takes place when unstable or unsaturated nitrogen and hydroxyl groups containing compounds of the character mentioned pass over into a more stable form whereby the hydrogen of the hydroxyl group and the radical R add on to the nitrogen residue and the oxygen becomes linked to the carbon by a double bond which changes into the final product by conversion or displacement according to the known theory of Beckmann-Curtius.

The object of our present invention is to provide a simple method of producing imino-ethers which in some respects may be regarded simply as an improvement over the process disclosed in said previous patent.

The present invention is based upon the observation that in case of alcohol being present in the reaction mixture, a condensation with one molecule of alcohol takes place at the same time while water is separated out so that a considerably good yield of imino-ethers will be obtained.

It is not certain whether the said condensation with alcohol sets in prior to the conversion of the hypothetical residue according to Beckmann-Curtius or afterwards, this question, however, is immaterial since in either case the valuable result is the very same. In the former case the reaction will take place according to the following formula:

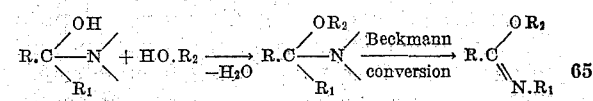

If, however, the condensation with alcohol sets in after or subsequent to the conversion or transposition according to Beckmann-Curtius the following formula will be explanatory

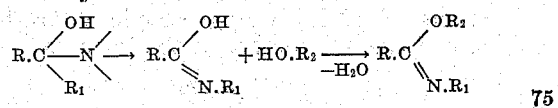

which is the tautomeric form of the acid amid.

The imino-ethers produced in accordance with our invention are highly active or capable of reaction and are intended for use as intermediate products or substances in the art of synthetically manufacturing medicinal remedies.

We shall now proceed to describe our invention more in detail by way of a few examples.

Example 1

A mixture of 84 grams of cyclopentanon and 600 cubic centimetres of a benzol solution of hydrazoic acid containing 65 grams of pure hydrazoic acid is gradually poured into 250 cubic centimetres of saturated ethyl-alcoholic hydrochloric acid. Or else dry gaseous hydrochloric acid may be introduced in the said reaction mixture upon having added to the latter an adequate quantity of ethylic alcohol.

When subsequently the solvent has been distilled off in vacuo, the resulting residue consists of the chlorohydrate of the imine ether which is treated with a strong solution of caustic potash in order to separate the base which then is separated from the dissolved chloride of potassium by means of ether. The latter is removed from the base by distillation and the resulting imino-ether of the formula

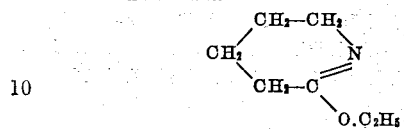

is subjected to fractional distillation.

The bulk thereof passes over in the form of a colourless liquid and the yield amounts to about 80 percent of the theoretical quantity.

The same result or final product is obtained if instead of the said 250 cubic centimetres of ethyl-alcoholic muriatic acid a mixture of 100 grams of concentrated sulphuric acid and 250 cubic centimetres of ethylic alcohol is employed.

*Example 2*

A mixture of 58 grams of acetone and 600 cubic centimetres of a benzene solution of hydrazoic acid containing 65 grams of pure hydrazoic acid is slowly poured by drops and under constant stirring into 250 cubic centimetres of a saturated solution of hydrochloric acid in ethylic alcohol. Development of gas sets in and when the mixture ceases to evolve gas, the same is subjected to distillation in vacuo for the purpose of removing the solvent therefrom. The residual substance consists of a highly hygroscopic chloro-hydrate of the imino-ether of the formula

The base then is separated out by means of a strong solution of caustic potash, subsequently treated and dissolved out with ether and the thus obtained ethereal solution is finally subjected to a careful drying treatment.

In the next following step of fractional distillation of the imino-ether which previously had been freed from ethylic ether by an intermediate distilling operation, the bulk thereof boils at a temperature of 99° to 100° C. The yield amounts to 50 percent of the theoretical output.

*Example 3*

98 grams of cyclohexanon mixed with 600 cubic centimetres of a benzene solution of hydrazoic acid containing 65 grams of pure hydrazoic acid are poured by drops into 250 cubic centimetres of normal butylic alcohol saturated with hydrochloric acid. The further operations are the very same as in Example 1, so that they need not be repeated.

The resulting imino-ether of the formula

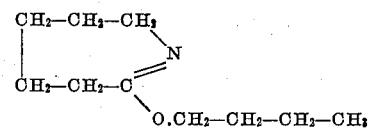

boils at a temperature of 214° C. to 216° C. The yield amounts in this case to about 80 percent of the theoretical output.

*Example 4*

50 grams of cyclohexanon mixed with 500 cubic centimetres of a benzene solution of hydrazoic acid containing about 25 grams of pure hydrazoic acid are slowly added by drops to a mixture of 150 grams of anhydrous chloride of zinc and 150 grams of n-butylic alcohol. When the development of gas ceases, a strong solution of caustic soda is added to the mixture in such excess that the liquid is plainly alkaline, whereupon the imino-ether formed or contained in the latter is separated therefrom by means of benzol or benzene and from the latter by way of distillation. The thus obtained crude imino-ether is subjected to fractional distillation for purifying purposes as usually.

The main product produced in this way is an imino-ether of the formula

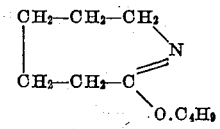

The yield amounts to 70 per cent of the theoretically obtainable quantity, a valuable by-product being pentamethylentetrazol.

*Example 5*

49 grams of cyclohexanon are mixed with 200 cubic centimetres of benzol or benzene containing 22 grams of hydrazoic acid and 200 cubic centimetres of ethylic alcohol are then added to the mixture whereupon 80 grams of thionyl chloride are slowly admixed by drops. When the development of gas ceases, the mixture is subjected to a distilling operation and a strong solution of caustic potash is added to the residual liquid in such excess that the latter is plainly alkaline. Subsequently the base -imido-ether- is extracted therefrom by means of ether.

The yield amounts to about 40 grams and 10 grams of leucinlactam are recovered as a by-product.

*Example 6*

The same proportions and working conditions as in Example 5 with the sole difference that instead of 80 grams of thionyl chloride 100 grams of phosphoric oxy-chloride are employed.

The yield amounts to 40 grams of imido-ether as in Example 5.

Our invention in its broadest aspects is not limited to any of the particular manufacturing modes as described in the foregoing examples, as many changes may be made therein without departing from the main principle of the invention and without sacrificing its chief advantages we therefore aim in the appended claims to embrace all modifications falling fairly within the scope of our invention.

What we claim is:—

1. The method of manufacturing iminoethers comprising reacting hydrazoic acid with ketones in the presence of a hydrazoic acid splitting catalyzer and of alcohol, both initially present at the beginning of the reaction.

2. The method of manufacturing iminoethers comprising reacting hydrazoic acid with ketones in the presence of a mineral acid and alcohol, both initially present at the beginning of the reaction.

3. The method of manufacturing iminoethers comprising reacting hydrazoic acid with ketones in the presence of hydrochloric acid and alcohol, both initially present at the beginning of the reaction.

4. The method of manufacturing iminoethers comprising reacting hydrazoic acid with ketones in the presence of an inorganic chloride to evolve hydrochloric acid during the reaction, and of alcohol, both initially present at the beginning of the reaction.

In testimony whereof we affix our signatures.

KARL FRIEDRICH SCHMIDT.
PHILIPP ZUTAVERN.